(12) United States Patent
Baxter et al.

(10) Patent No.: US 7,778,895 B1
(45) Date of Patent: Aug. 17, 2010

(54) USER INTERFACE FOR DISPLAYING IMPORTED TAX DATA IN ASSOCIATION WITH TAX LINE ASSIGNMENTS

(75) Inventors: Gregory B. Baxter, El Cajon, CA (US); Kathy L. Eusepi, Cary, NC (US); Gillian Meyer, Encinitas, CA (US); Kenichi Mori, Carlsbad, CA (US); Joseph M. Quadros, Rancho Santa Fe, CA (US); Jackie Rierdan, San Diego, CA (US); Sara Y. Clancy, San Diego, CA (US); Mary Kate Anderson, Carlsbad, CA (US); Elaine Marie Conway, Vista, CA (US)

(73) Assignee: Intuit Inc., Mountain View, CA (US)

( * ) Notice: Subject to any disclaimer, the term of this patent is extended or adjusted under 35 U.S.C. 154(b) by 772 days.

(21) Appl. No.: 11/302,964

(22) Filed: Dec. 13, 2005
(Under 37 CFR 1.47)

Related U.S. Application Data

(60) Provisional application No. 60/636,557, filed on Dec. 15, 2004.

(51) Int. Cl.
*G06Q 40/00* (2006.01)

(52) U.S. Cl. .................. 705/31; 705/30; 705/36 T; 705/35

(58) Field of Classification Search .............. 705/31, 705/30, 35, 36 T
See application file for complete search history.

(56) References Cited

U.S. PATENT DOCUMENTS

| | | | |
|---|---|---|---|
| 2002/0111888 A1* | 8/2002 | Stanley et al. | ........... 705/31 |
| 2004/0088233 A1* | 5/2004 | Brady et al. | ........... 705/31 |

OTHER PUBLICATIONS

"General Electric Implements enumerate Software to Streamline Financial Reporting" by Robin Cover (http://xml.coverpages.org/XBRL-Creator-Announce.html).*

* cited by examiner

*Primary Examiner*—James A Kramer
*Assistant Examiner*—James A Vezeris
(74) *Attorney, Agent, or Firm*—Osha • Liang LLP

(57) ABSTRACT

A system, method, and a user interface that allows a user of a tax preparation application to view a tax augmented accounting report in which tax related data from a financial accounting application is associated with an accounting line item and a tax line assignment for the accounting line item.

13 Claims, 11 Drawing Sheets

Import Preview Report Definition

Report Title ——— 810
Report Sub-Title ——— 812

Suppress Sub-Total Display? (True/False)
Suppress Underlines? (True/False)
Show Accounting Basis (True/False)

Report Beginning Date ⎫ ——— 816
Report Ending Date ⎭

Report Tree (1 to n<u>Report Row Text</u> Items)

---

<u>Report Row Text</u> Item ——— 820

Tow Text Value ——— 830
Sub-Total Value ——— 835

Parent <u>Report Row Text</u> item

Report Row Text Tree (0 to n<u>Report Row Text</u> Items)
Report Row Data Tree (0 to n<u>Report Row Data</u> Items)

---

<u>Report Row Data</u> Item ——— 840

Underline Style (non, single, double)
Row Data Description ——— 860
Row Data Value ——— 870

Account Name ——— 880
Account Amount ——— 885

Tax Line Assignment Number ——— 850
Tax Line Assignment Description ——— 890

*FIG.7*

Gross Receipts or Sales

Gross receipts (total sales) from your trade or business operations, and any returns and allowances imported from QuickBooks.

Note(1): Changing or adding to an imported ammount REPLACES the Imported amount.

Note(2): We will import rental real estate information later in Schedule K.

Gross Receipts or Sales  221,395.

Returns and Allowances (enter as a positive number)

Imported from QuickBooks
Service Revenue............ $221,395.
Total Gross Receipts or Sales....... $221,395.

○ Back
○ Continue
○ Show Tax Form

*Easy Step*

Help & Info
Have a question?

Eg. What is an EIN? [ask]

Help & Info Center
Talkt to a Tax Advisor

Common Questions
't my don't amounts, What can I do?
How do I make an additional entry to an imported field?
Where do I report my rental real estate activity?
What is trade or business income?
Do I enter income from investments here?

*FIG.9*

USER INTERFACE FOR DISPLAYING IMPORTED TAX DATA IN ASSOCIATION WITH TAX LINE ASSIGNMENTS

CROSS-REFERENCE TO RELATED APPLICATION

This application claims the benefit of U.S. Provisional Application No. 60/636,557, entitled "User Interface For Displaying Imported Tax Data In Association With Tax Related Categories", filed Dec. 15, 2004, which is incorporated by reference herein in its entirety.

BACKGROUND

The present invention relates to the preparation and filing of tax returns using online and desktop tax preparation and planning software.

At present, many businesses track and manage their finances using financial accounting software. A typical user of a financial accounting software would enter on a daily basis financial transactions associated with the day-to-day operation of the business. When a user enters a financial transaction, it is recorded under an account category. Exemplary account categories are "accounts receivable", "accounts payable", "office expense", and "rent." By entering all of the financial transactions, a business owner or an individual can quickly obtain an accurate picture of the business finances. Various financial accounting applications are available that offer a variety of reports, such as a Profit and Loss Statement and a Balance Sheet Statement, which can be used for analyzing the current financial condition of the business.

It has become commonplace for taxpayers to use online or desktop tax planning software to prepare and file a tax return with the taxing authority, such as the Internal Revenue Service (IRS) in the United States, or other various national, state and local governments throughout the world. Data is obtained from the taxpayer herself through a direct user input. The interview process solicits data from the taxpayer by inquiring about the taxpayer's tax-related information. The tax preparation software also enables importing tax data from a variety of import sources, such as financial institutions, financial accounting applications, and other sources.

The interview process asks a taxpayer whether the taxpayer maintains his financial records in the financial accounting software. If the taxpayer responds affirmatively, she is asked whether she would like to import tax-related data from the financial accounting software directly into the tax return. The tax preparation software may initiate the import of the tax-related data from the financial accounting software per taxpayer's request or the taxpayer can choose to initiate the import process directly. The tax preparation software generates an accounting screen that allows the taxpayer to preview the tax-related data prior to the actual import. The taxpayer is asked to review or verify the data that will be imported. The taxpayer, as the user of the financial accounting software, is accustomed to viewing financial data under familiar accounting categories and typically does not know how these data relate to the tax data that appear in the tax return. Thus, when a taxpayer is asked to preview the tax data summarized under tax-related designations (e.g., income, deductions, and business deductions) as they appear in the tax return, the taxpayer does not understand where the data came from. Hence, the taxpayer may begin to doubt the completeness and accuracy of the data import process.

SUMMARY

In various embodiments the present invention provides methods, systems, computer programs, and an improved user interface that allows a user of a tax preparation application to view a tax augmented accounting report in which tax related data from a financial accounting application is associated with an accounting line item and a tax line assignment for the accounting line item. This allows the user to understand where in the tax return tax related data will be reported. It further allows the user, typically a business person, to understand the tax related data in the context of the more familiar accounting reports. The tax augmented accounting report can be obtained by the user at any time during the tax return preparation.

A system in accordance with the present invention includes a data import module, a parsing module, and a rendering module. The data import module requests from the financial accounting application financial transactions for a tax period provided by the user. The data import module also requests an accounting report for the tax period. The parsing module processes the received accounting report to generate a tax augmented accounting report that includes the tax related data from the financial accounting application in association with an accounting line item and a tax line assignment for the accounting line item. In addition, the report displays a total amount for the tax line assignment.

The features described in this summary and the following detailed description are not all-inclusive. Many additional features will be apparent to one of ordinary skill in the art in view of the drawings, specification, and claims hereof. Moreover, it should be noted that the language used in this disclosure has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 7 is an illustration of one embodiment of a tax augmented accounting report definition data structure generated by the tax preparation application.

FIG. 9 is an illustration of one embodiment of a screen presented to a user illustrating source of the imported data.

One skilled in the art will readily recognize from the following discussion that alternative embodiments of the structures and methods illustrated herein may be employed without departing from the principles of the invention described herein.

DETAILED DESCRIPTION OF EMBODIMENTS

Overview

Figure 1:
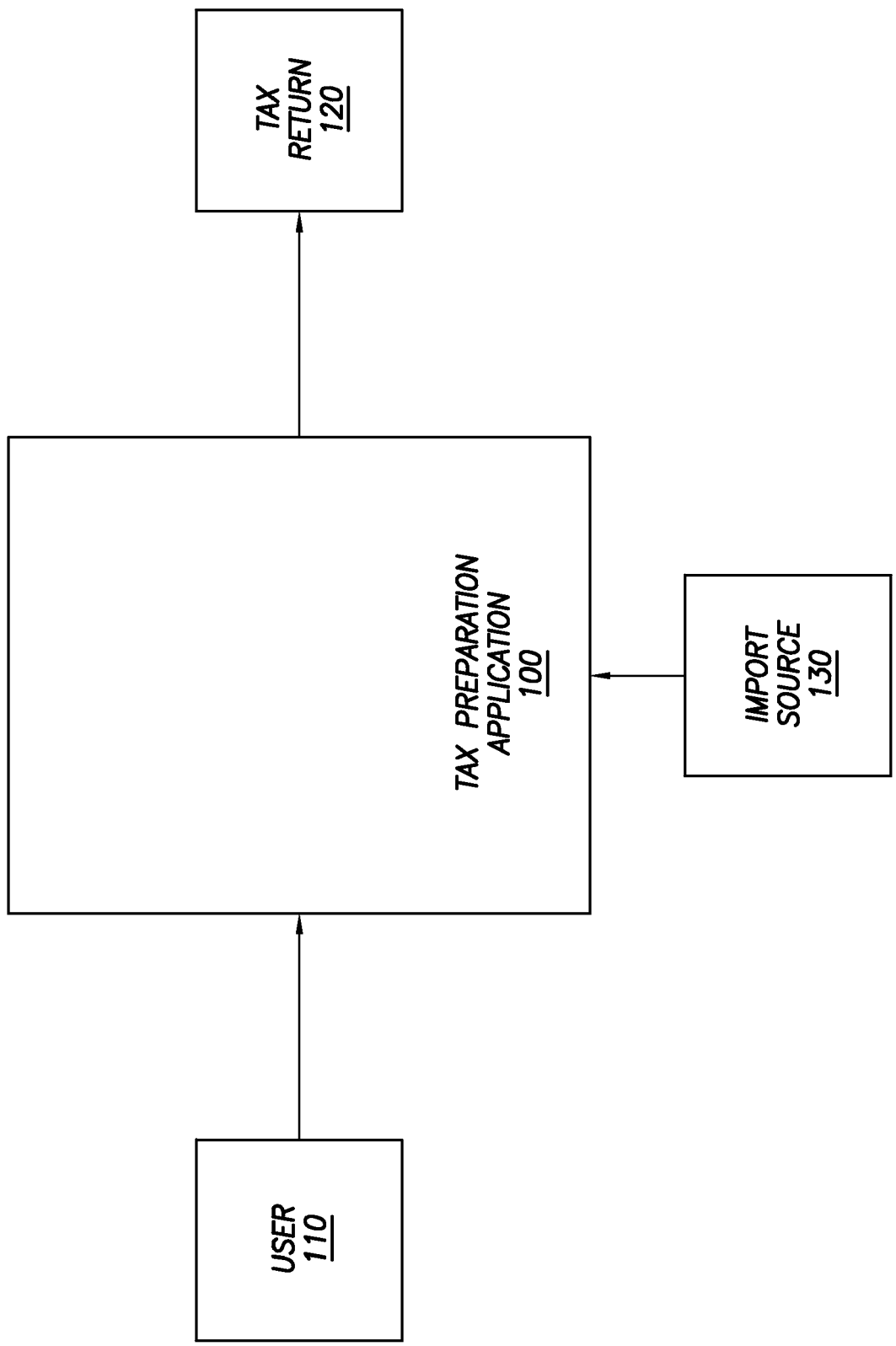
FIG. 1 is an illustration of one embodiment of a block diagram of a system for importing data into tax preparation application.

Referring now to FIG. 1, there is illustrated a process for acquiring tax-related data by tax preparation application 100. A user 110 ultimately wants to submit a prepared tax return 120, using online or desktop tax preparation application 100, to a taxing authority, such as the Internal Revenue Service in the Untied States, or to other various national, state and local governments throughout the world. User 110 can be a taxpayer herself or any other individual authorized by the taxpayer to prepare and submit the tax return with a taxing authority. The tax preparation application 100 synthesizes data about the taxpayer from three primary sources: 1) the taxpayer herself; 2) import sources 130; and 3) information already stored, whatever the original source is. Data is obtained from the taxpayer herself through direct user input. In one embodiment, this direct user input is solicited through an interview process. Through a process called universal data import, the data is imported over a communications network 240 from a variety of import sources 130, such as banks, brokerage firms, mortgage lenders, payroll processors, and from financial accounting and management software.

The interview process is provided by the tax preparation application 100 as a series of screens and prompts to which the user responds with data, such as amounts, names, dates, and the like. For example, the interview process asks a user 110 whether she maintains her financial records in a financial accounting software. If the taxpayer 110 responds affirmatively, she is asked whether she would like to import tax-related data from the financial accounting software directly into the tax return.

In an embodiment of the present invention, if the user wants her financial data to be imported from a financial accounting software, the user 110 is asked during the interview process to provide a company name, beginning tax year date, ending tax year date, and accounting method used (e.g., cash basis or accrual basis). The user 110 provides the requested information to the tax preparation application 100. The tax preparation application 100 generates an import preview screen in the form of a tax augmented accounting report, such as the one shown in FIG. 2, which allows the taxpayer 110 to preview the tax-related data prior to the actual import.

Tax Augmented Accounting Report

Figure 2:
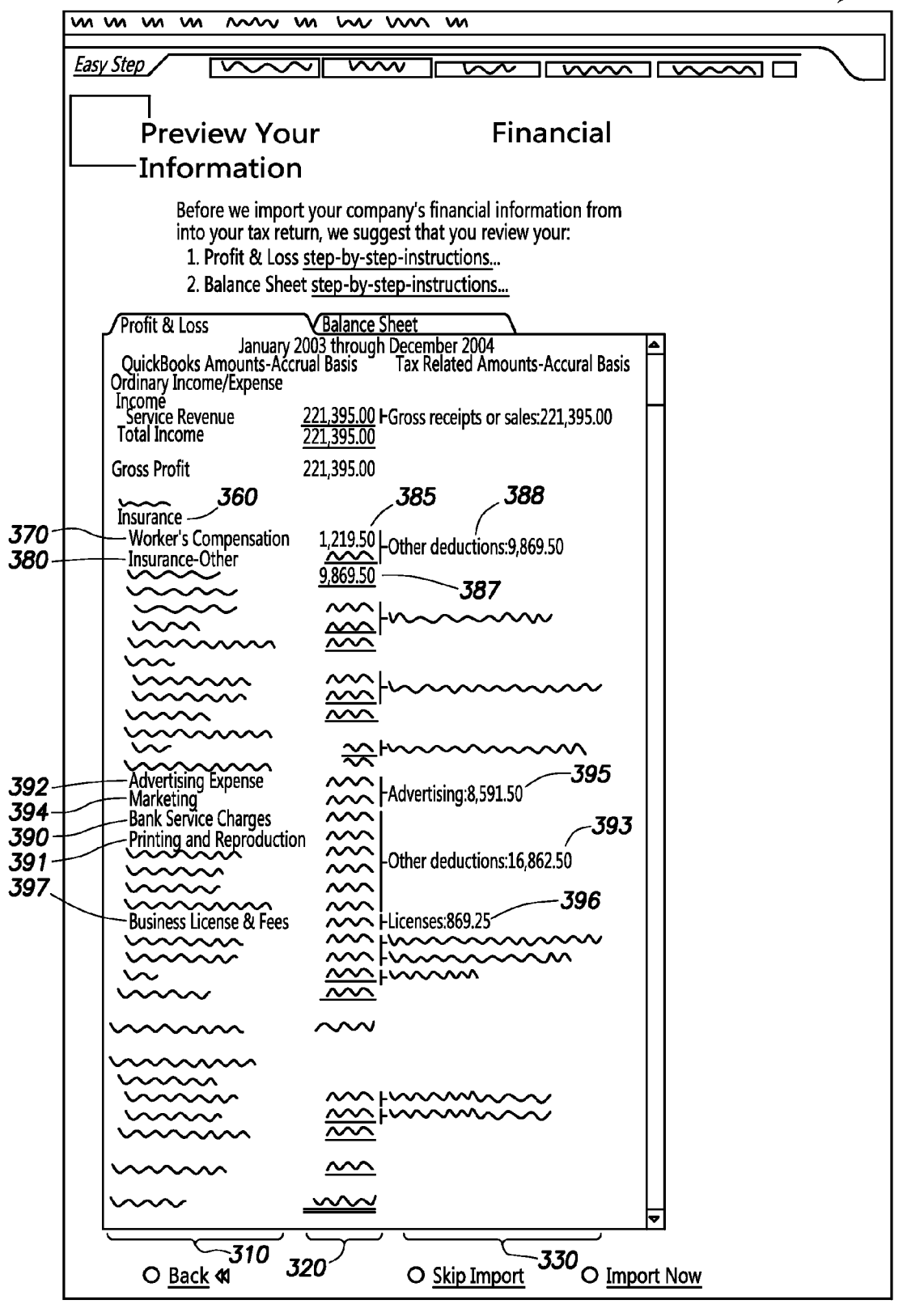
FIG. 2 is an illustration of one embodiment of an import preview report in the form of a tax augmented accounting report showing relationship between user's financial data in a Profit and Loss Statement and associated tax line assignments.

Referring now to FIG. 2, there is shown an illustration of an exemplary import preview report 300 in the form of a tax augmented accounting report provided by the tax preparation software 100 that offers a user an opportunity to preview her financial data. In the example of FIG. 2, the tax augmented accounting report is the Profit and Loss (P&L) statement, which can be generated by the financial accounting software before the data is imported to the tax return. The tax augmented accounting report 300 displays the relationship between the financial data in the P&L format and tax line assignments that correspond to tax fields in the tax return. It should be noted that in the report shown in FIG. 2 all of the financial data is tax related, and hence will be reported to the tax return. However, this need not always be true—some of the financial data may be unrelated to tax liability and therefore is not reported to the tax user's tax return. The P&L statement is but one example of an accounting report provided by the financial accounting application. Those of skill in the art can readily appreciate that many other types of accounting reports can be provided to the user 110 by the tax preparation application 100. Using accounting reports allows a typical user who is a business person, rather than a tax expert, to understand the tax effects of their business operations (as shown by the tax related categories and tax category totals) in the context of the more familiar accounting reports (e.g., accounting line items in a cash flow, profit and loss, or similar report). Although the present invention is described in the context of generating a tax augmented accounting report for purposes of previewing the tax data before it is being imported to the tax preparation application 100, one skilled in the art would understand that the generated tax augmented accounting report can be obtained at any time during the operation of the tax preparation application 100. Alternatively, the tax augmented accounting report can be provided as a report available in a financial accounting software application.

Generally, the P&L statement summarizes the company's revenue and expenses for a specific period of time. The import preview report 300 is generated for the tax period between January 2003 and December 2003. Report 300 includes a plurality of accounting line items, such as account categories and subcategories shown in the leftmost column 310, amounts for account categories and subcategories shown in the middle column 320, and the corresponding tax line assignment and the total amounts shown in the rightmost column 330. Previewing financial data recorded under familiar account categories (e.g., income and expenses) that the user of the tax preparation application 100 is accustomed to seeing in association with tax line assignments (e.g., business deductions, other deductions and other tax line assignments) rather than merely previewing tax-related data summarized and categorized under tax categories, the user 110 understand where the data will be reported in the tax return.

1. Account Categories and Subcategories 310

In financial accounting applications, financial transactions are recorded under account categories and subcategories. Account categories and subcategories can represent nodes in a tree structure. Nodes in a tree structure are in a parent-child relationship. A parent node of a child node is closer to the root node in a tree structure than the child node. A node can be an account category or a subcategory. Still referring to report 300 in FIG. 2, an accounting transaction representing purchase by the business of the worker's compensation insurance can be recorded under category "insurance" 360 and subcategory "worker's compensation" 370. A financial transaction that represents purchase of other than the "worker's compensation" insurance can be recorded under category "insurance" and subcategory "other insurance" 380. The category "insurance" 360 is a parent to subcategories "worker's compensation" 370 and "other insurance" 380. In this example, "insurance" 360 is a parent node and "worker's compensation" 370 and "other insurance" 380 are child nodes.

It should be noted that not all of the account categories are further categorized into account subcategories. For example, account categories "advertising expense" 392 and "marketing" 394 are account categories that do not have account subcategories. Whether a particular account category is further broken into an account subcategory depends on the nature of the financial transactions recorded by the user.

2. Amounts for Account Categories and Subcategories 320

In report 300, corresponding amounts owned by an account category and account subcategory are listed in column 320. For example, the total amount owned by account subcategory "worker's compensation" 370 is "1,219.50." The total amount owned by account subcategory "other insurance" 380 is "8,650.00." These amounts are rolled into the total amount 387 owned by the parent account category "insurance" 360.

As previously described, account categories and subcategories and their total amounts as shown in FIG. 2 are familiar data that the user of a financial accounting application is accustomed to seeing. What the user is not accustomed to seeing though is how these data are represented in tax-related categories and amounts.

3. Tax Line Assignment and Total Amounts 330

Account categories and subcategories are displayed in association with tax line assignments that correspond to tax fields in a tax return to which the amounts owned by account categories and subcategories will be reported. As was previously described, a user 110 of the financial accounting application is not aware of how account categories, subcategories and their amounts are related to the tax-related categories. When the familiar account categories and subcategories are displayed in association with tax line assignments, the user 110 understands where in the tax return the data will be reported.

Continuing with FIG. 2, the total amount associated with a tax line assignment is an aggregate of the amounts owned by corresponding account categories. For example, the total of amounts for account category "insurance" 360 (and hence for its account subcategories "worker's compensation" 370 and "other insurance" 380) is recorded on the IRS Form 1120S under tax-related designation "other deductions" 388 with the total amount of "9,869.50."

It should be noted that tax line assignments can be associated with more than one account category or account subcategory in the report 300. Whether a tax line assignment is associated with more than one account category or subcategory depends on the nature of the financial transactions recorded by the user of the financial accounting application. For example, in FIG. 2, tax line assignment "advertising" 395 is associated with two account categories "advertising expense" 392 and "marketing" 394. In contrast, tax line assignment "licenses" 396 is associated with one account category "Business & License Fees" 397.

After the user 110 of the tax preparation application 100 is presented with the report 300, the user can go to a previous screen, skip import of the data, or initiate the import process.

Figure 3:
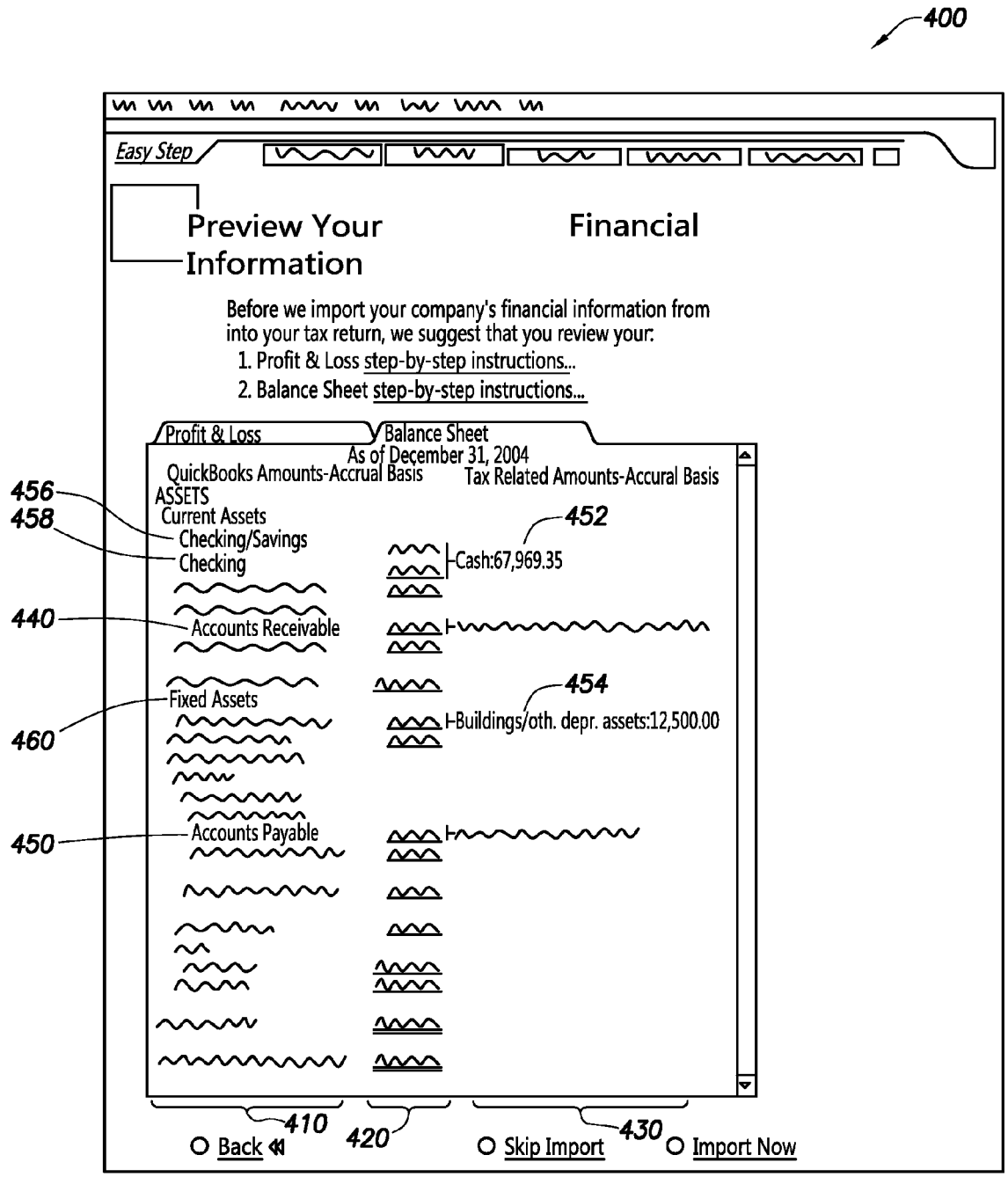
FIG. 3 is an illustration of one embodiment of an import preview report in the form of a tax augmented accounting report showing relationship between user's financial data in Balance Sheet and associated tax line assignments.

Referring now to FIG. 3, there is shown an import preview report 400 in the form of a tax augmented accounting report provided by the tax preparation application 100 according to another embodiment of the present invention. The report 400 offers a user an opportunity to preview her financial data. In the example of FIG. 3, the tax augmented accounting report is a Balance Sheet report, which can be generated by a financial accounting application before the data is imported to the tax return. Similar to report 300, tax augmented accounting report 400 displays the relationship between the financial data in the balance sheet and tax line assignments that correspond to the tax fields in the tax return. The Balance Sheet is but one example of an accounting report provided by the financial accounting application. Those of skill in the art can readily appreciate that many other types of reports can be provided to the user 110 by the tax preparation application 100.

Continuing with FIG. 3, generally, a Balance Sheet is a snapshot of a business's financial position at a particular point in time. It compares what the business owns (its assets) with what it owes (otherwise referred to as its liabilities). The balance sheet shown in FIG. 3 is a snapshot of the company's finances as of Dec. 31, 2004. The report shown in FIG. 3 includes accounting line items, such as account categories and subcategories shown in the leftmost column 410, amounts for account categories and subcategories shown in the middle column 420, and the corresponding tax line assignments and the total amounts shown in the rightmost column 430. Again, previewing the financial data recorded under familiar account categories (e.g., "accounts receivable" 440, "accounts payable" 450, and other account categories) that the user is accustomed to seeing as the user of the financial accounting software in association with tax line assignments (e.g., "cash" 452, "buildings/other depreciating assets" 454, and other tax line assignments) the user understands where in the tax return the data will be reported. Accordingly, the user feels more confident that the process will result in an accurate and complete tax return.

4. Account Categories and Subcategories 410

As was previously discussed in reference to FIG. 2, financial transactions are recorded under account categories and subcategories. For example, an accounting transaction that represents an increase in the checking or saving bank account increases the value of the amount owned by the "checking/savings" 456 account category and its child account subcategory "checking" 458.

5. Amounts for Account Categories and Subcategories 420

The report shown in FIG. 3 lists in column 420 corresponding amounts owned by an account category and account subcategory. For example, the total amount owned by account subcategory "checking" is "2,719.35." The total amount owned by account subcategory "savings" is "65,250.00." These amounts are rolled into the total amount "67,969.35" owned by the parent account category "checking/savings" 456.

Account categories, subcategories and total amounts shown in the balance sheet in FIG. 3 are familiar data that the user of a financial accounting software is accustomed to seeing.

6. Tax Line Assignments and Total Amounts 430

Account categories and subcategories in report 400 are displayed in association with tax line assignments that correspond to tax fields to which the amounts owned by account categories and subcategories will be recorded in the tax return. Since the user of the financial accounting application is not aware how these account categories, subcategories and their amounts are related to the tax data, the user feels more confident in the tax preparation process when the familiar data is displayed in association with tax line assignments that correspond to tax fields in the tax return. Now the user understands the relationship between the two pieces of data.

Continuing with the description of report 400, the total amount recorded in the tax return for a tax-related designation is an aggregate of the amounts owned by corresponding account categories. For example, the total of amounts owned by account category "checking/savings" 458 are recorded on Schedule L of IRS Form 1120S of the tax return under tax-related designation "cash" 452.

Similar to FIG. 2, tax line assignments in FIG. 3 can be associated with more than one account category or account subcategory. Whether a particular tax line assignment appears in association with more than one account category depends on the nature of the financial transactions recorded by the user of the financial accounting application. For example, in the report shown in FIG. 3, tax line assignment "cash" 452 is associated with two account categories "checking" 456 and "savings" 458. Tax line assignment "buildings/other depreciating assets" 454 is associated with one account subcategory "Office furniture & equipment" 460.

After the user of the tax preparation application 100 is presented with the screen 400, the user can go to a previous screen, skip import of the data, or initiate the import process.

System Architecture

Figure 4:
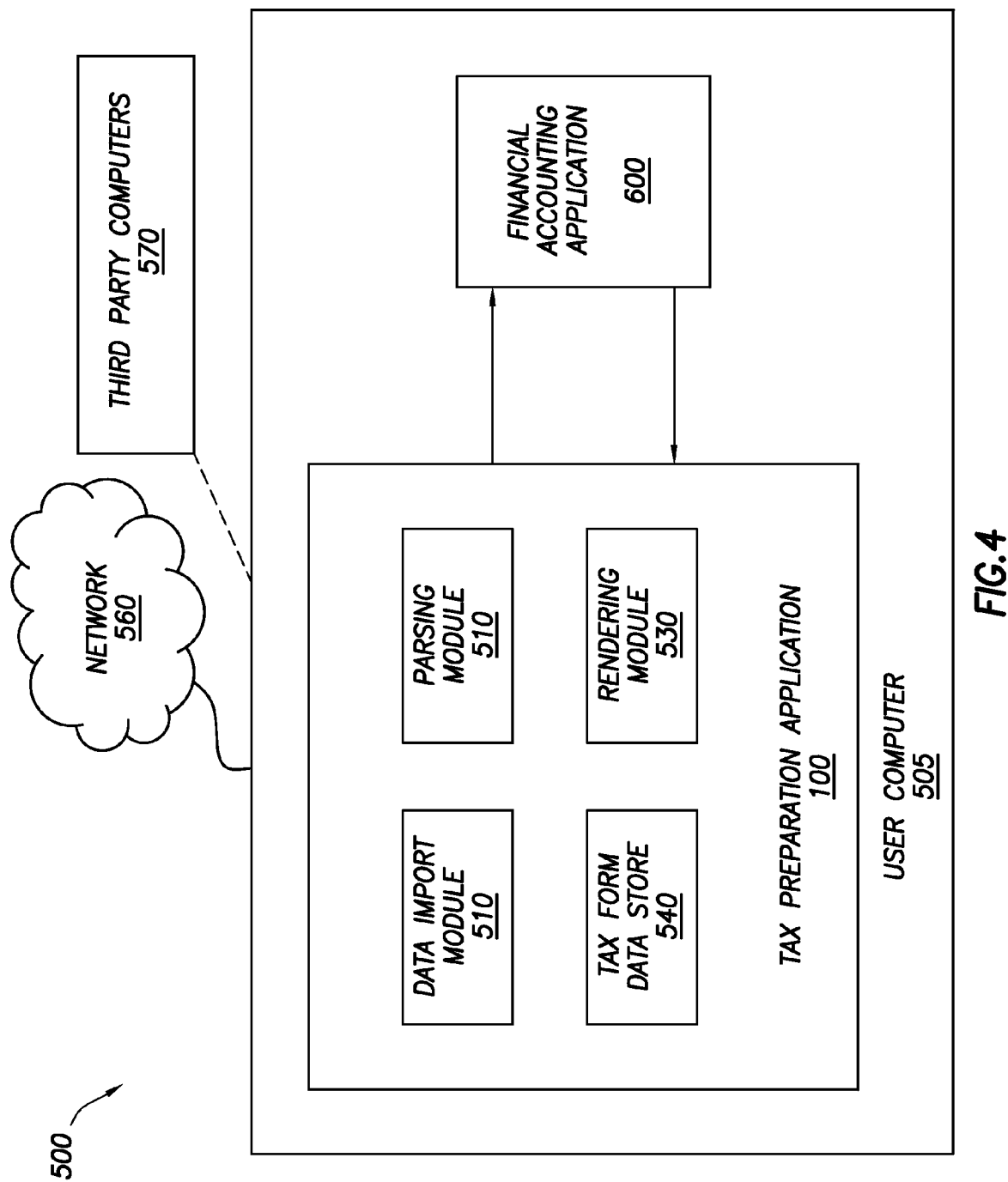
FIG. 4 is a block diagram illustrating the architecture of one embodiment of a system for generating a tax-augmented accounting report.

Referring now to FIG. 4, a block diagram illustrating the architecture of one embodiment of a system 500 for generating a tax-augmented accounting report. In such a system 500, there is provided at least one user computer 505, which may be a stand-alone device or may be communicatively coupled to a network 560 and/or one or more third party computers 570, as indicated by a dotted line.

The user computer 505 is of conventional design, and includes a processor, an addressable memory, and other conventional features (not illustrated) such as a display, local memory, input/output ports, and a network interface. In other embodiment one or more of the components of the user computer 505 may be located remotely and accessed via a network, e.g., 560. The network interface and a network communication protocol provide access to a network 560, along with access to the Internet, via a TCP/IP type connection, or to other network embodiments, such as a LAN, a WAN, a wired or wireless network, a private network, a virtual private network, or other networks. In various embodiments the user computer 505 may be implemented on a computer running a Microsoft operating system, MacOS, various flavors of Linux, UNIX, Palm OS, and/or other operating systems.

The third party computers 570, if present, also may be computer systems, similar to the user computer described above. For example, one embodiment of a third party computer 570 is a financial institution computer. The financial institution Could be a securities brokerage company, a bank or credit unit, or a credit card company.

The user computer 505 includes a tax preparation application 100 and a financial accounting application 600. The tax preparation application 100 and financial accounting application 600 are comprised of a number of executable code portions and data files. Tax preparation application 100 includes a data import module 510, a parsing module 520, a rendering module 530, and a tax form data store 540.

Data import module 510 is an example of one means for importing data into tax preparation application 100. Importing data can include receiving a request from a user 110 to import data from a financial accounting application 600, sending a request to the financial accounting application 600 for financial transactions that correspond to the tax year period and accounting method provided by the user 110, and receiving financial transactions from the financial accounting application. As will be described in greater detail below in reference to FIG. 5, financial transactions are recorded by application 600 under account categories and subcategories. An account category has an associated tax line assignment that is used by tax preparation application 100 to determine where in the tax return the total for the account category is reported. Thus, when data import module 510 receives financial transactions from application 600, it also retrieves a tax line assignment for account categories. Importing data can also include receiving an accounting report.

Parsing module 520 is an example of one means for processing the accounting report received by the data import module 510 and processing the report to generate a tax augmented accounting report. The generated tax augmented accounting report includes accounting line items and a tax line assignment for the accounting line items. The tax augmented accounting report also includes a total amount for the tax line assignment. Parsing module 520 can be implemented as Xerces XML parser.

Rendering module 530 is an example of one means for rendering the generated tax augmented accounting report.

Figure 11:
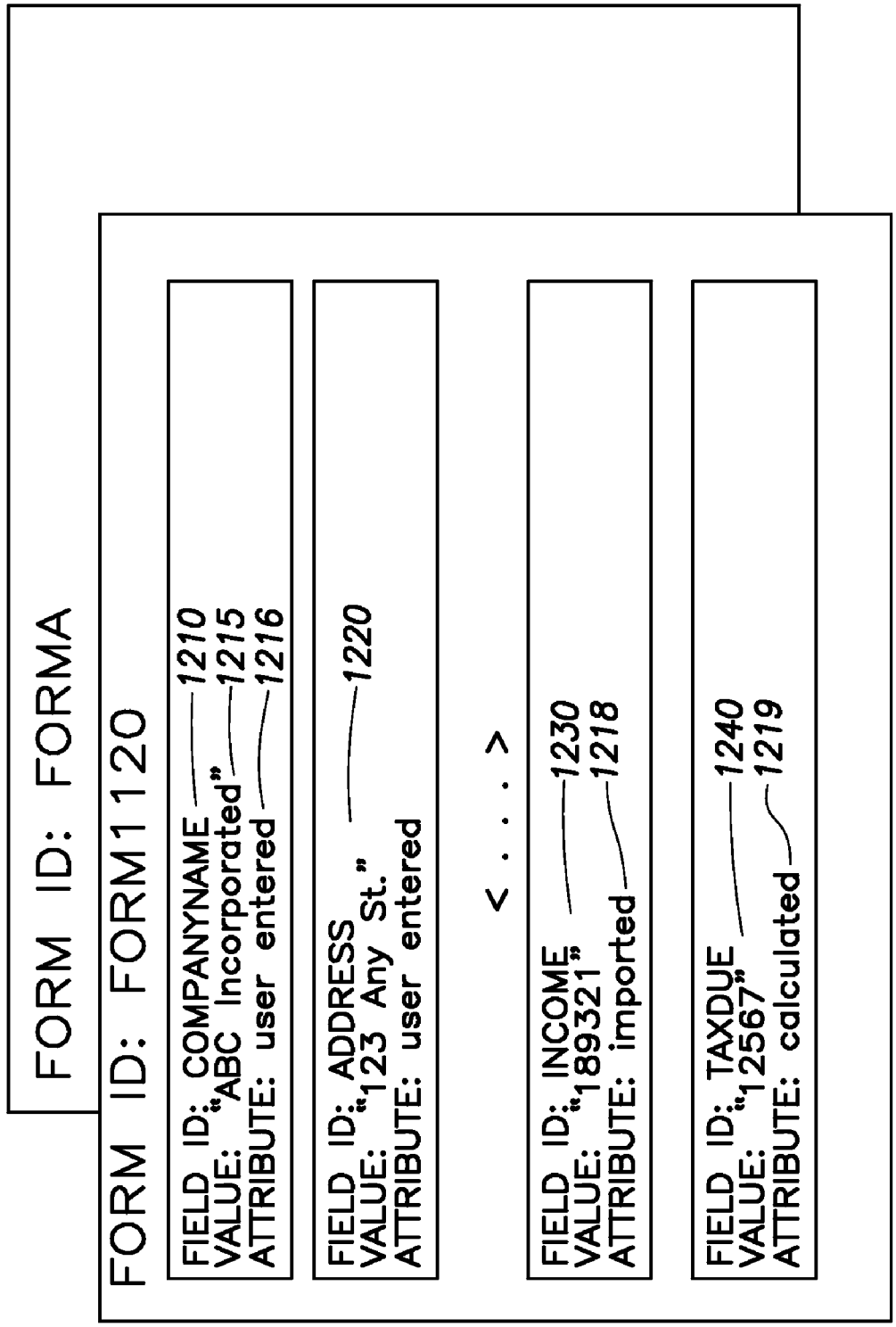
FIG. 11 illustrates an exemplary data structure of a tax form.

Tax form data store 540 maintains a collection of tax forms that are acceptable for filing with a taxing authority. Referring now to FIG. 11, an exemplary data structure of a tax form is shown. A form within file 540 has a unique identifier. For example, Form 1120 has a form ID "Form1120." A form contains one or more fields, each field having its unique ID, an associated value, and an attribute that provides additional information associated with the field. FIG. 11 illustrates exemplary field IDs "company name" 1210, "address" 1220, "income" 1230, and "tax due" 1240. An exemplary value for the field with the field ID "company name" is "ABC Incorporated" 1215. An attribute can be, for example, a "user entered" 1216, "calculated" 1219, "overridden", or "imported" 1218. Tax form data store 540 stores mappings between tax line assignments provided in a financial accounting application 600 and tax form field locations in appropriate tax forms.

Tax preparation application 100 may be provided to the user computer 505 on a computer-readable media, such as a CD-ROM, diskette, or by electronic communication over the network from one of the third party computers or other distributors of software, for installation and execution thereon. Alternatively, the software application 100 can be hosted on a server computer (not shown in FIG. 4), and accessed over the network 560 by the user, using for example a browser interface to the tax preparation application 100.

Financial accounting application 600 is a software that is used for analyzing current financial condition of a business. Financial accounting application 600 maintains business transactions under relevant account categories. Financial accounting application 600 also contains a variety of reports, such as a Profit and Loss Statement and a Balance Sheet Statement, which can be used for analyzing the current financial condition of the business. Similar to tax preparation application 100, financial accounting application 600 may be provided to the user computer 505 on a computer-readable media, such as a CD-ROM, diskette, or by electronic communication over the network from one of the third party computers 570 or other distributors of software, for installation and execution thereon. Alternatively, financial accounting application 600 can be hosted on a server computer (not shown in FIG. 4), and accessed over the network 560 by the user, using for example a browser interface to the financial accounting application 610.

Figure 6:
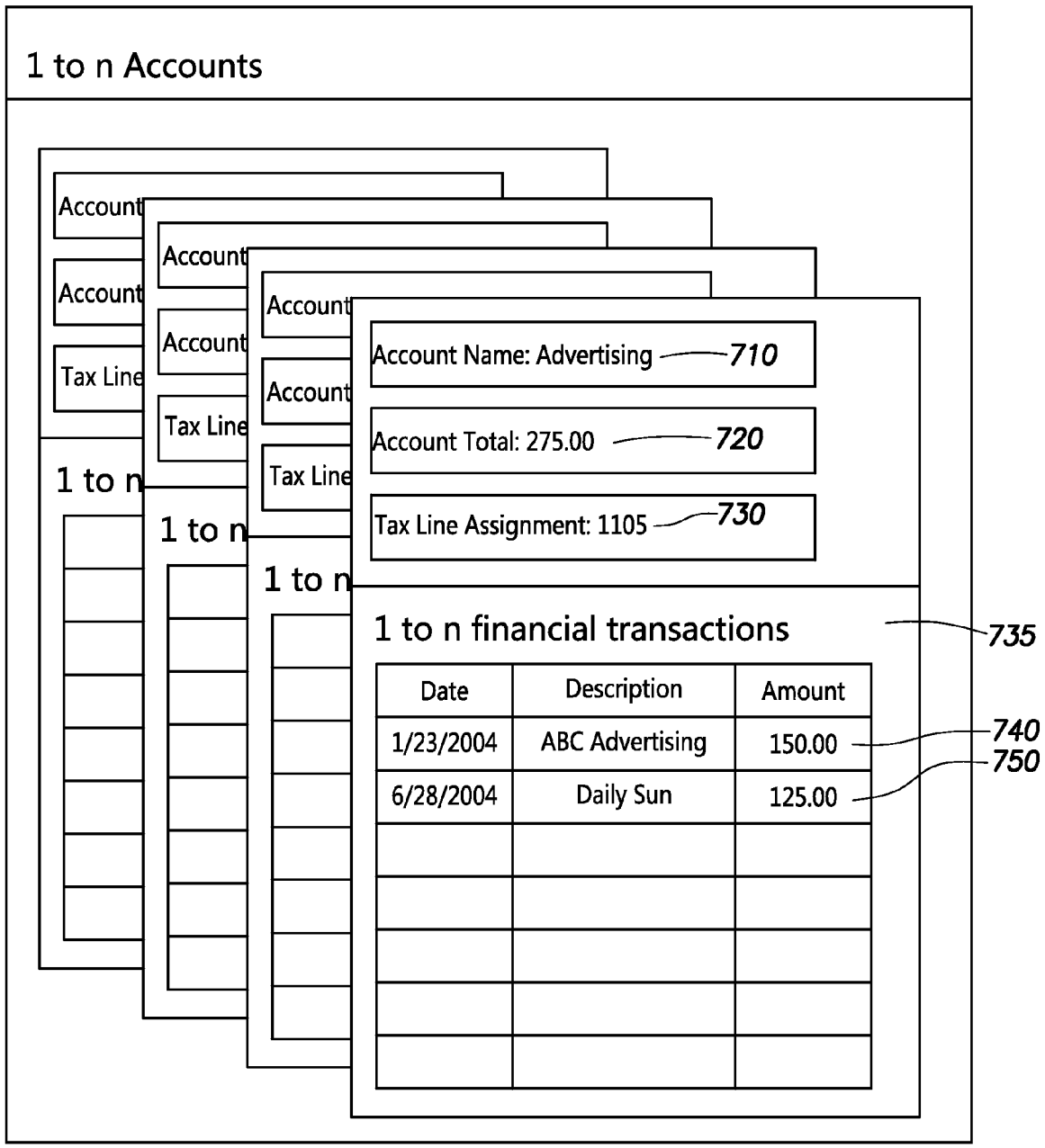
FIG. 6 is an illustration of one embodiment of a structure of financial data stored in a financial accounting application.

Financial accounting application 600 records financial transactions under account categories and account subcategories. Referring now to FIG. 6, exemplary financial records stored in the financial accounting application 600 are shown. In FIG. 6, each account contains a name of the account category 710, total for the account category 720, tax line assignment 730, and one or more financial transactions 735 that the account category owns.

Name of account category 710 represents a user-entered alphanumeric description that identifies an account category. For example, in FIG. 6, "advertising" is the name of the account category.

Total for account category 720 represents an aggregated amount for all financial transactions owned by the account category. For example, in FIG. 6, "275" is the total for account category "ABC advertising."

Tax line assignment 730 is a numeric identifier that maps the account category to a tax field destination in a tax return. The tax line assignment is used by the tax preparation application 100 to determine where in the tax return a total for an account category will be reported when the data is imported from a financial accounting application 600. For example, tax line assignment of "1105" is mapped to "advertising expense" field in the tax return.

Financial transactions 735 are all financial transactions owned by the account category. A transaction includes a date, description, and amount. The aggregate of all the transactions amounts represent the total of the account category. When a taxpayer purchased ABC advertising on Jan. 23, 2004 for $150.00 an exemplary transaction 740 is recorded. When a user purchased Daily Sun advertising on Jun. 28, 2004 for $125.00, an exemplary transaction 750 is recorded. The total of the account category "advertising" is an aggregate of $150.00 and $125.00, e.g., $275.00.

Exemplary Methods of Operation

Figure 5:
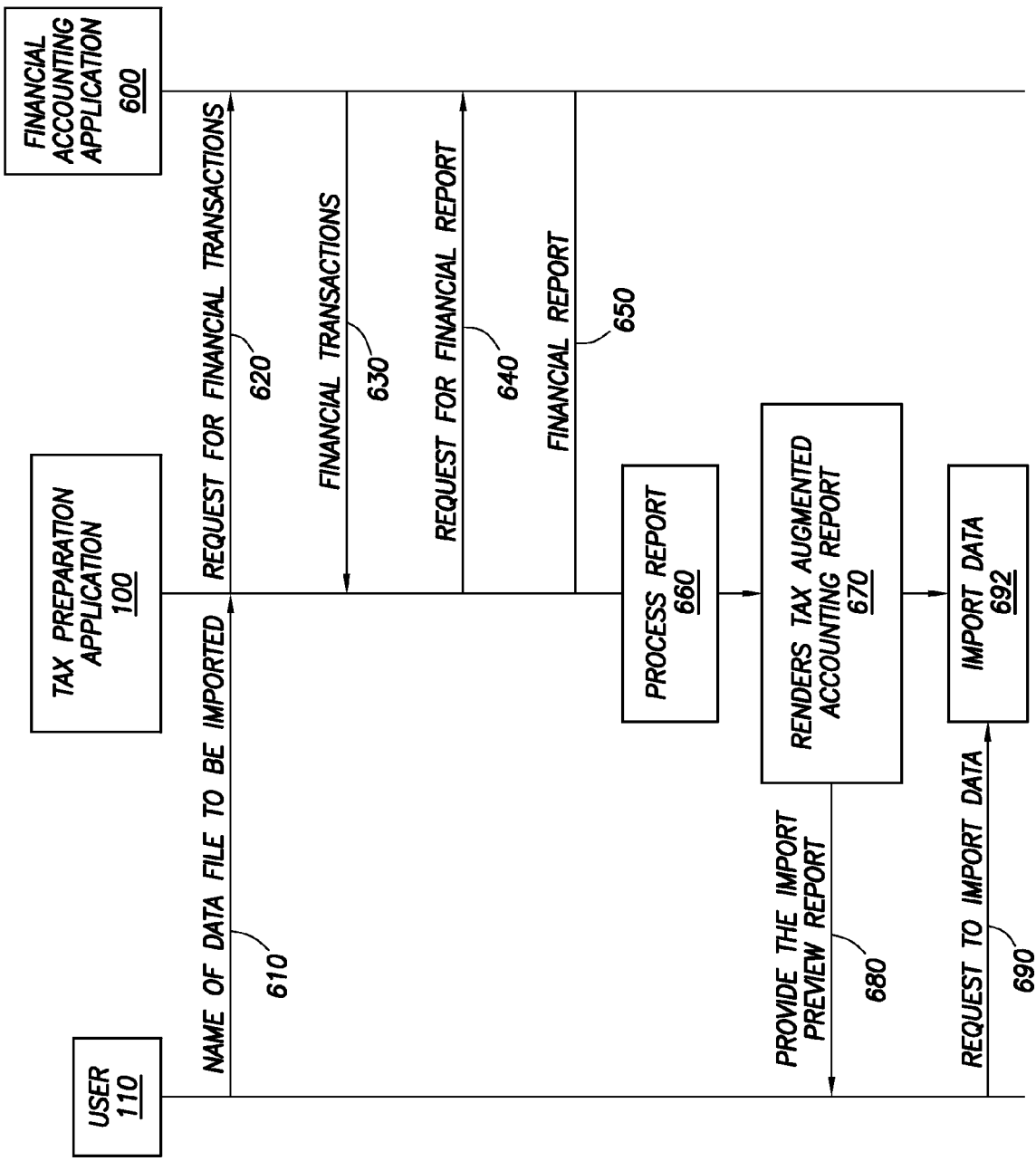
FIG. 5 is an event diagram of one embodiment of a method for generating a tax-augmented accounting report.

FIG. 5 is an event diagram illustrating exemplary transactions performed by tax preparation application 100, a user 110, and financial accounting application 600. In FIG. 5, the above entities are listed across the top. Beneath each entity is a vertical line representing the passage of time. The horizontal arrows between the vertical lines represent transactions between the associated entities. It should be noted that not every transaction is shown in FIG. 5. In other embodiments of the present invention, the order of the transactions can vary.

1. Importing Tax Related Data from Financial Application

Initially, a user 110 of the tax preparation application 100 is asked whether she maintains her financial records in a financial accounting application. If the user 110 responds affirmatively, she is asked whether she would like to import tax-related data from the financial accounting application 600 directly into the tax return. The user 110 may be requested to provide 610 the name of the data file in the financial accounting application 600 from which she wants the data to be imported. The user may also be requested to provide the beginning and end of the tax period and the accounting method (e.g., cash or accrual). Tax preparation application 100 invokes an interface to request 620 financial transaction information from the financial accounting application 600.

At step 630, tax preparation application 100 receives data from the financial accounting application 600. In one implementation, the data includes account categories, a total amount for account categories, and a tax line assignment for an account category. The data also includes accounting transactions owned by the account category.

2. Importing Financial/Accounting Reports

At step 640, data import module 510 of tax preparation application 100 invokes a report interface (not shown in FIG. 5) to retrieve financial or accounting type reports from financial accounting application 600. Although one embodiment of the present invention will be described in the context of the P&L Statement and Balance Sheet report, these reports are just examples of financial reports provided by the financial accounting application 600. At step 650, financial accounting application 600 provides financial reports 650 to tax preparation application 100. Those of skill in the art can readily appreciate that many other types of accounting reports can be retrieved by tax preparation application 100 from financial accounting application 600.

In one implementation, to retrieve a financial or an accounting report, data import module 510 makes a request using function calls. These calls create an XML request that is sent to financial accounting application 600. The report interface provides the "Tax Year Beginning Date" and "Tax Year Ending Date" to the financial accounting application 600 and initiates a connection with the financial accounting application 600. Below is an example of an XML request for a P&L Statement sent by tax preparation application 100 to financial accounting application 600.

```
<?xml version="1.0"?>
<?qbxml version="2.0"?>
<QBXML>
    <QBXMLMsgsRq on Error="stopOnError">
        <GeneralSummaryReportQueryRq requestID="1"
<GeneralSummaryReportType>ProfitAndLossStandard</
GeneralSummaryReportType>
    <ReportPeriod>
        <FromReportDate>"2004-01-31"</FromReportDate>
        <ToReportDate>"2004-12-31"</ToReportDate>
    </ReportPeriod>"
    <SummarizeColumnsBy>TotalOnly</SummarizeCol-
        umnsBy>
    </General SummaryReportQueryRq>
    </QBXMLMsgsRq>
</QBXML>
```

This XML request to financial accounting application 600 is for a P&L Statement for the period between Jan. 31, 2004 and Dec. 31, 2004.

The example shown below is an XML request for a Balance Sheet Statement sent by tax preparation application 100 to financial accounting application 610 for the period between Jan. 31, 2004 and Dec. 31, 2004.

```
<?xml version="1.0"?>
<?qbxml version="2.0"?>
<QBXML>
    <QBXMLMsgsRq on Error="stopOnError">
        <GeneralSummaryReportQueryRq requestID="1"
<GeneralSummaryReportType>BalanceSheetStandard</
GeneralSummaryReportType>
    <ReportPeriod>
        <FromReportDate>"2004-01-31"</FromReportDate>
        <ToReportDate>"2004-12-31"</ToReportDate>
    </ReportPeriod>"
    <SummarizeColumnsBy>TotalOnly</SummarizeCol-
        umnsBy>
    </GeneralSummaryReportQueryRq>
    </QBXMLMsgsRq>
</QBXML>
```

Financial accounting application 600 receives the request and provides 650 the response that includes the content of the requested report.

3. Generating Tax Augmented Accounting Report

Parsing module 520 receives the requested financial or accounting report and creates a Data Object Model (DOM) tree data structure. The DOM tree structure includes a root node and child nodes. The DOM tree data structure includes, for example, a TEXTROW node, a DATAROW node, and a SUBTOTAL node.

TEXTROW can be an accounting line item in the report that does not include an account category or account subcategory. For example, in report 300 shown in FIG. 2, "Ordinary Income/Expense" is a TEXTROW item.

DATAROW node is an accounting line item in the financial report that includes an account category or an account subcategory. For example, in FIG. 2 "worker's compensation" 370 is a DATAROW item.

Parsing module 520 processes 660 the financial accounting report by traversing nodes contained within the DOM representation of the report. Parsing module 520 creates a tax augmented accounting report, such as the one shown in FIG. 7.

In one implementation, parsing module 520 extracts Report Title, Report Sub-Title, Report Dates, and Accounting basis from the retrieved financial report using name string references. For example, to extract a Report Title, parsing module 520 invokes "GetSubElementStringValue" with the named string reference to "Report Title." The new report title is stored next to "Report Title" 810 field.

Figure 8:
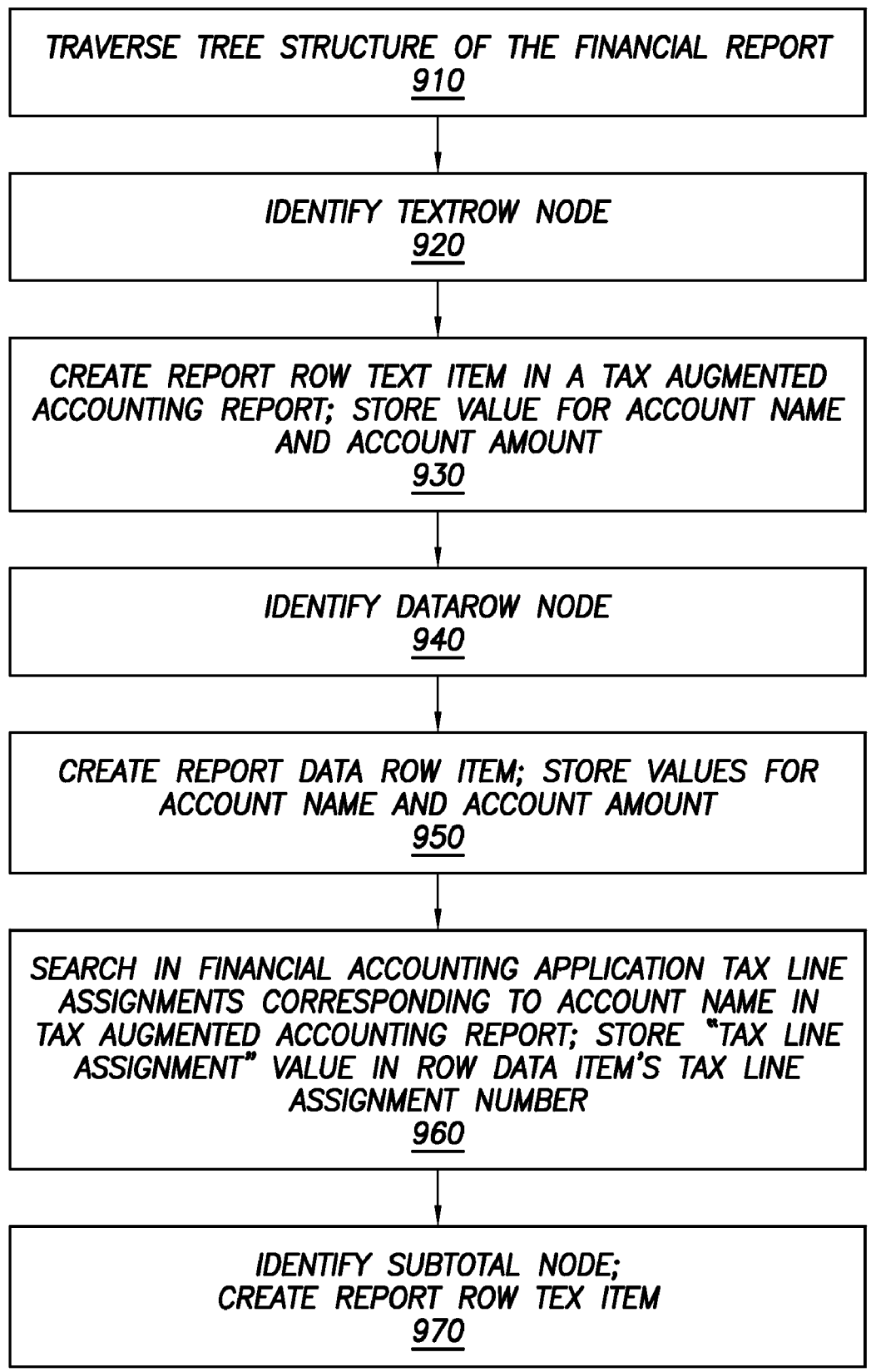
FIG. 8 is a flow diagram of a method for processing a financial report provided by a financial accounting application to generate a tax-augmented accounting report according to an embodiment of the present invention.

Referring now to FIG. 8, a flow chart of a method for parsing a tree structure of the retrieved financial report is shown. As parsing module 520 traverses 910 the DOM tree representation of the financial report, it analyzes each node. If the node is a "TEXTROW" node 920, a "Report Row Text Item" is created in the generated report. The value for the "TEXTROW" is stored in the "Row Text Value" field 830. For example, "ordinary income/expense" is a TEXTROW node. When parsing module 520 encounters this node, it creates a Report Row Text Item. Since "ordinary income/expense" line does not have an associated value, no value is stored in the "Row Text Value" field 830.

Next, parsing module 510 determines 930 whether the node is a "DATAROW" node and creates 930 a "Report Row Data" item 840 in response to a positive determination. In one implementation, "DATAROW" node includes account categories or account subcategories in the financial report, such as in a P&L Statement. Parsing module 520 stores account name and account amount in the tax augmented accounting report.

Parsing module 520 uses the account name and account amount to search financial accounting application 600 to identify corresponding tax line assignments. Referring again to FIG. 6, in financial accounting application 600, accounts are stored in association with tax line assignments. Parsing module 520 retrieves tax line assignments corresponding to the account name and account amount encountered in a financial accounting report and stores the values in the tax augmented accounting report. Parsing module 520 uses mappings stored by tax preparation application 100 to identify tax assignment description corresponding to the retrieved tax line assignments and stores the description to the "Tax Line Assignment Description" item 890 in the tax augmented accounting report definition data structure 800. For example, tax line assignment "1105" maps to "Advertising" in a tax return.

At step 970, parsing module 520 identifies a SUBTOTAL node and creates a Report Row Text item in the tax augmented accounting report.

4. Rendering the Tax Augmented Accounting Report

Referring again to FIG. 5, once the tax augmented accounting report has been generated, rendering module 530 renders 670 the report on the screen. Below is description of one embodiment of a method for rendering the report.

In one implementation, when rendering module 530 encounters a Report Row Data item, module 530 determines whether the tax line assignment number for that item matches at least one other tax line assignment number in the report. If there is a match, module 530 aggregates all Row Data Values for Report Row Data items that have the same tax line assignment number. Rendering module 530 groups Report Row Data items having the same tax line assignment number and displays the grouped items along with the corresponding tax line assignment description for that tax line assignment number. In one implementation, module 530 draws a vertical line next to Report Row Data items having the same tax line assignment description. Rendering module 530 also displays the total amount next to the tax line assignment description. This amount will be reported to the tax return into the field that corresponds to the tax line assignment description. This amount represents an aggregate amount of the Row Data Values for all the Report Row Data items having the same tax line assignment number.

If the tax line assignment number for the Report Row Data item does not match any tax line assignment number previously encountered by rendering module 530 while rendering the tax augmented accounting report or the next item in the preview import report is a Report Row Text Item, rendering module 530 displays the Report Row Data item in association with the tax line assignment description for that item. In addition, module 530 displays the total amount next to the tax line assignment description. This total amount is a Row Text Value for the Report Row Data item.

Referring again to FIG. 2, tax augmented accounting report 300 is shown. As was discussed earlier, the tax augmented accounting report 300 includes the tax related data from the P&L Statement in association with accounting line items (e.g., items 360, 370, and 380) and a tax line assignment for the accounting line items. Where more than one accounting line item share the same tax line assignment, one tax line assignment is displayed next to these accounting line items. For example, in the report 300, accounting line items "Bank Service Charges" 390 and "Printing and Reproduction" 391 share the same tax line assignment "other deductions" 393. Hence, only one tax line assignment, "other deductions" 393, is displayed next to these accounting line items. In addition, the total amount for the tax line assignment is displayed. The total amount represents an aggregate of all amounts owned by those accounting line items that correspond to the tax line assignment for those accounting line items. Again, one skilled in the art would understand that the generated report can be obtained at any time during the operation of the tax preparation application 100.

Referring again to FIG. 5, once the tax augmented accounting report has been previewed by a user 110, the user can request 690 the import of the tax related data into the tax return. Data import module 510 uses data stored tax form data store 540 to cause data import. As was previously described, tax form data store 540 stores mappings between tax line assignment numbers and tax field destinations in a tax return. Data import module 510 uses the mappings to transfer the data to corresponding fields in the tax return.

One skilled in the art would understand that although the generation of the tax augmented accounting report provided to the user is described in the context of the preview, a user can obtain the tax augmented accounting report at any time during the operation of the tax preparation application 100.

Displaying Source of the Imported Data

Often, users want to review the data that has been imported to the tax return. To this end, a user 110 is provided with a screen that allows a user 110 to review the data that has been imported to the tax return. Such an exemplary screen is shown in FIG. 9. The screen 1000 displays tax line assignment description, such as "Gross Receipts or Sales" 1006 and the corresponding total value "$221,395" for that tax line assignment description. Screen 1000 provides the user of the tax preparation application 100 with the ability to see the data imported into the tax return along with the account category from the financial accounting application 600 that provides the source of the imported data. In FIG. 9, when the user moves the mouse cursor over the edit box control icon 1008, window 1004 is displayed. Window 1004 displays, for example, the name of the financial accounting application 600 from which the data is imported, an account category, e.g., "Service Revenue", and the total amount for the account category that provide the source for the imported data. If the amount represents the aggregate value of the amounts for two or more account categories, each account category and its corresponding amount would appear within window 1004.

Figure 10:
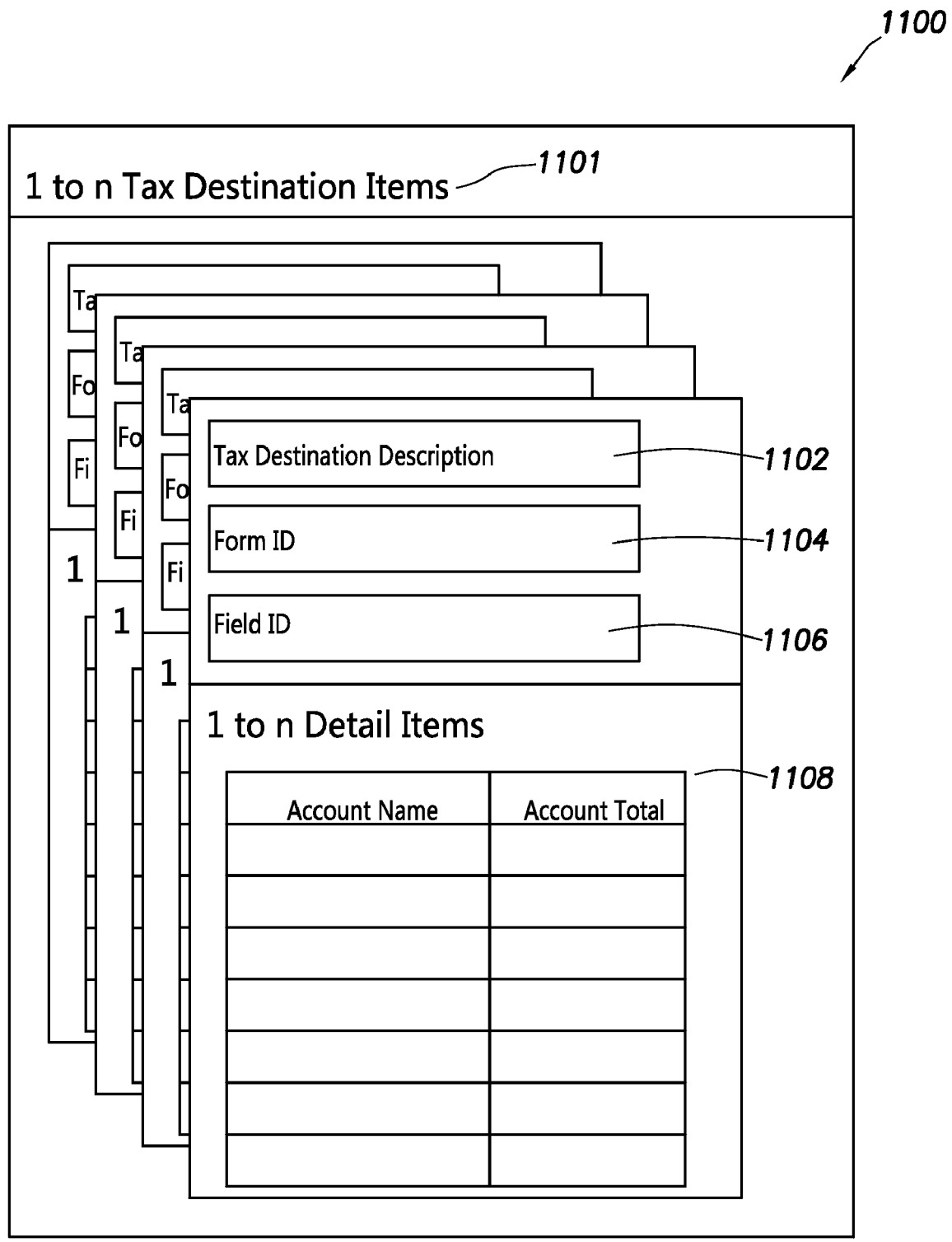
FIG. 10 illustrates an exemplary structure of the tax data import source file used to identify source of the imported data according to an embodiment of the present invention.

To implement this embodiment, the following processing takes place. Referring now to FIG. 10, in one implementation, once the data has been imported into the tax return, data import module 510 generates a tax import source data file 1100 that can be used by tax preparation application 100 to provide to the user 110 the source of the imported data. File 1100 stores a plurality of tax destination items $1101_1$ through $1101_n$. A tax destination item 1101 has the following structure:

Tax Destination Description 1102 is a tax related description that identifies the field in a tax return that contains the imported data. For example, "Total Gross Receipts or Sales" is the tax related description that identifies the field in the tax return.

Form ID 1104 is the identifier provided from the tax form data store 540 that uniquely identifies the form within the tax return that contains the imported data. For example, "FORM1120" is an example of the form identifier.

Field ID 1106 is the unique identifier provided by tax form data store 540 that identifies the field on the form that contains the imported data. For example, "LINE10" is an example of the field identifier.

Detail Items 1108 are account names and corresponding amounts that were used for import to the form/field identified by this tax destination item.

Tax destination items are stored in file 1100 in association with corresponding account categories and amounts for the account categories.

In one implementation, before a user is presented with a screen such as the one shown in FIG. 9, an editing interface (not shown) within tax preparation application 100 queries tax form data store 540 for the attribute associated with the field to be displayed on the screen shown in FIG. 9. In one implementation, if the attribute is of type "Imported", the editing interface "paints" the imported field in a different color and displays the name of the financial accounting application in the right-hand corner of the edit box control icon 1008 to indicate that the value is imported from the financial accounting application. When the user "hovers' their mouse-cursor over icon 1008 to request that the detail associated with the imported value be displayed, the editing interface queries tax form data store 540 for the Form ID and Field ID. Using the retrieved Form ID and Field ID, the editing interface queries for tax destination items that have the same Form ID and Field ID. The editing interface then retrieves values for an account name and account total stored in association with the tax destination item. The editing interface displays the retrieved data window 1004 using, for example, a ToolTip™ application. As a result, the user can review the source of the imported data.

Thus, the present invention allows a user of a tax preparation application to view a tax augmented accounting report in which tax related data from a financial accounting application is associated with an accounting line item and a tax line assignment for the accounting line item. In addition, the present invention allows a user to review the source of the data imported into a tax return.

The present invention has been described in particular detail with respect to the two possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet. Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for displaying tax related data comprising, receiving, by a tax preparation application (TPA) executing on a processor, a plurality of financial categories and a plurality of tax line assignment numbers for the plurality of financial categories from a financial accounting application (FAA);
   receiving, by the TPA, an accounting report from the FAA after receiving the plurality of financial categories;
   identifying a financial category of the plurality of financial categories within the accounting report using the TPA;
   mapping the financial category to a tax line assignment number of the plurality of tax line assignment numbers using the TPA;
   identifying a tax line assignment description based on the tax line assignment number using the TPA;
   generating, by the TPA, a tax augmented accounting report comprising the accounting report and the tax line assignment description next to the financial category; and
   displaying the tax augmented accounting report.

2. The computer-implemented method of claim 1, wherein the tax augmented accounting report further comprises a total dollar amount next to the tax line assignment description.

3. The computer-implemented method of claim 1, wherein the tax augmented accounting report is displayed to a user from the FAA.

4. The computer-implemented method of claim 1, wherein the tax augmented accounting report is provided during an import of tax data to the TPA.

5. The computer-implemented method of claim 1, further comprising:
   providing a user interface that includes tax data imported tax data of the TPA;
   receiving a user request to provide a source of the imported tax data;
   identifying the source of the imported tax data; and
   displaying to the user the imported tax data in association with the source of the imported tax data.

6. A system for displaying tax related data comprising:
   a processor;
   a memory operatively connected to the processor;
   a financial accounting application (FAA) stored in the memory and executing on the processor; and
   a tax preparation application (TPA) stored in the memory and executing on the processor and comprising:
      a data import module configured to:
         receive a plurality of financial categories and a plurality of tax line assignment numbers for the plurality of financial categories from the FAA; and
         receive an accounting report from the FAA after receiving the plurality of financial categories;
      a parsing module configured to:
         identify a financial category of the plurality of financial categories within the accounting report;
         map the financial category to a tax line assignment number of the plurality of tax line assignment numbers;
         identify a tax line assignment description based on the tax line assignment number; and
         generate a tax augmented accounting report comprising the accounting report and the tax line assignment description next to the financial category; and
      a rendering module configured to display the tax augmented accounting report.

7. The system of claim 6, wherein the tax augmented accounting report further comprises a total dollar amount next to the tax line assignment description.

8. The system of claim 6, wherein the rendering module is further configured to:
   provide the tax augmented accounting report to a user during an import of tax data to the TPA.

9. The system of claim 6, further comprising an editing engine configured to:
   provide a user interface that includes imported tax data of the TPA;
   receive a user request to provide a source of the imported tax data;
   identify the source of the imported tax data; and
   display to the user the imported tax data in association with the source of the imported tax data.

10. A computer readable medium storing instructions to display tax related data, the instructions executable on a processor and comprising functionality to:
   receive, by a tax preparation application (TPA), a plurality of financial categories and a plurality of tax line assignment numbers for the plurality of financial categories from a financial accounting application (FAA);
   receive, by the TPA, an accounting report from the FAA after receiving the plurality of financial categories;
   identify a financial category of the plurality of financial categories within the accounting report using the TPA;
   map the financial category to a tax line assignment number of the plurality of tax line assignment numbers using the TPA;
   identify a tax line assignment description based on the tax line assignment number using the TPA;

generate, by the TPA, a tax augmented accounting report comprising the accounting report and the tax line assignment description next to the financial category; and display the tax augmented accounting report.

11. The computer-implemented method of claim 1, wherein the accounting report is a profit and loss statement.

12. The system of claim 6, wherein the accounting report is a profit and loss statement.

13. The computer readable medium of claim 10, wherein the accounting report is a profit and loss statement.

* * * * *

UNITED STATES PATENT AND TRADEMARK OFFICE
CERTIFICATE OF CORRECTION

| | | |
|---|---|---|
| PATENT NO. | : 7,778,895 B1 | Page 1 of 1 |
| APPLICATION NO. | : 11/302964 | |
| DATED | : August 17, 2010 | |
| INVENTOR(S) | : Gregory B. Baxter et al. | |

It is certified that error appears in the above-identified patent and that said Letters Patent is hereby corrected as shown below:

In the Claims:

In Claim 1, Column 15 (line 40), a --,-- after "data" should be added and the "," after "comprising" should be deleted and replaced with a --:--.

In Claim 5, Column 16 (line 3), "tax data" should be deleted.

Signed and Sealed this

Fifth Day of October, 2010

David J. Kappos
*Director of the United States Patent and Trademark Office*